United States Patent
Krishnaraj et al.

(10) Patent No.: US 6,175,485 B1
(45) Date of Patent: *Jan. 16, 2001

(54) ELECTROSTATIC CHUCK AND METHOD FOR FABRICATING THE SAME

(75) Inventors: Padmanabhan Krishnaraj; Brian Lue, both of Mountain View; Ramkishan Rao Lingampalli, Fremont; Shun Jackson Wu, Cupertino, all of CA (US)

(73) Assignee: Applied Materials, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/684,113

(22) Filed: Jul. 19, 1996

(51) Int. Cl.$^7$ .................................................... H02N 13/00
(52) U.S. Cl. ........................................... 361/234; 279/128
(58) Field of Search .................................. 361/230–235; 279/128

(56) References Cited

U.S. PATENT DOCUMENTS

| | | | |
|---|---|---|---|
| 2,714,563 | 8/1955 | Poorman | 117/105 |
| 3,231,416 | 1/1966 | Fuller | 117/105.2 |
| 3,505,101 | 4/1970 | Koffskey, Jr. et al. | 117/105.2 |
| 3,941,903 | 3/1976 | Tucker, Jr. | 427/190 |
| 3,992,230 | 11/1976 | Komiyama et al. | 148/6.3 |
| 4,163,071 | 7/1979 | Weatherly et al. | 427/34 |
| 4,330,568 | 5/1982 | Boehm et al. | 427/34 |
| 4,379,134 * | 4/1983 | Weber et al. | 423/626 |
| 4,480,284 * | 10/1984 | Tojo et al. | 361/234 |
| 4,826,734 * | 5/1989 | Jackson et al. | 428/472 |
| 4,839,239 | 6/1989 | Ducos et al. | 428/623 |
| 4,902,539 | 2/1990 | Jackson | 427/423 |
| 5,055,964 | 10/1991 | Logan et al. | 361/234 |
| 5,099,571 * | 3/1992 | Logan et al. | 29/825 |
| 5,104,834 * | 4/1992 | Watanabe et al. | 501/127 |
| 5,151,845 | 9/1992 | Watanabe et al. | 361/234 |
| 5,350,479 | 9/1994 | Collins et al. | 156/345 |
| 5,384,682 * | 1/1995 | Watanabe et al. | 361/234 |
| 5,418,015 | 5/1995 | Jackson et al. | 427/452 |
| 5,451,470 | 9/1995 | Ashary et al. | 428/552 |
| 5,463,525 | 10/1995 | Barnes et al. | 361/234 |
| 5,463,526 | 10/1995 | Mundt | 361/234 |
| 5,535,838 * | 7/1996 | Keshavan et al. | 175/374 |
| 5,572,398 * | 11/1996 | Federlin et al. | 361/234 |
| 5,591,269 * | 1/1997 | Arami et al. | 118/723 R |
| 5,607,541 * | 3/1997 | Kubota et al. | 361/234 |
| 5,671,116 * | 9/1997 | Husain | 361/234 |
| 5,792,562 * | 8/1998 | Collins et al. | 428/463 |
| 5,880,922 | 3/1999 | Husain | 361/234 |

FOREIGN PATENT DOCUMENTS 5-008140 * 1/1993 (JP) ................................ B23Q/3/15

OTHER PUBLICATIONS

Handbook of Inorganic Compounds, edited by Dale L. Perry and Sidney L. Phillips, p. 10, New York, USA, 1995.*
Kirk–Othmer Encyclopedia of Chemical Technology, vol. 2, 4th edition, pp. 12–13, New York, USA, 1992.*

* cited by examiner

Primary Examiner—Michael J. Sherry
(74) Attorney, Agent, or Firm—Townsend & Townsend & Crew

(57) ABSTRACT

The present invention provides an electrostatic chuck having a dielectric layer with improved porosity and electrical properties, and a method for fabricating the dielectric layer and applying the layer to a pedestal to form a portion of an electrostatic chuck. The dielectric layer is formed by a detonation gun process which includes igniting a fuel gas mixture to form a detonation wave and propelling aluminum oxide powder onto the pedestal at high speeds. The dielectric layer has a porosity of less than 1 percent of its total volume, which improves the electrical properties of the chuck, such as its dielectric strength and the dielectric constant. In addition, the low porosity decreases the adsorption of moisture and other gases into the dielectric layer, which further enhances the electrical properties of the chuck.

45 Claims, 3 Drawing Sheets

ELECTROSTATIC CHUCK AND METHOD FOR FABRICATING THE SAME

BACKGROUND OF THE INVENTION

The present invention relates to the fabrication of integrated circuits. More particularly, the invention provides an electrostatic chuck having an improved dielectric coating and a method for fabricating the improved dielectric coating.

Electrostatic chucks are devices which have gained wide usage in the semiconductor industry for clamping semiconductor wafers during manufacturing processes, such as high-density plasma reactions. Electrostatic chucks employ an electrostatic force between oppositely charged surfaces to secure the wafer to the chuck. Fabrication of electrostatic chucks typically involves machining a process-compatible metal, such as aluminum or anodized aluminum, into a suitable support pedestal and grit-blasting the top surface of the pedestal. A layer of dielectric material, such as ceramic, is then typically applied to the upper surface of the pedestal and ground to a smooth, planar upper surface for supporting the wafer. During processing, a voltage is applied between the wafer and the metal pedestal, generating an opposing charge on either side of the dielectric layer. This opposing charge creates an attractive, substantially uniform, coulomb force therebetween that secures the wafer to the dielectric layer.

One important consideration in the manufacture of electrostatic chucks is the electrical properties of the layer of dielectric material, such as its dielectric strength and dielectric constant. For example, the clamping force of an electrostatic chuck, i.e., the force with which the wafer is held in place on the chuck, generally increases with the square of the applied voltage to the chuck (for a given dielectric layer thickness). In typical processes, a relatively large voltage is applied across the electrostatic chuck to clamp the semiconductor wafer to the chuck during processing. This large clamping voltage is usually required because cooling gas is delivered between the semiconductor wafer and the chuck to decrease the temperature of the wafer. This cooling gas impinges on the back side of the wafer and lifts the wafer away from the chuck. Increasing the dielectric strength of the dielectric layer increases the capability of the dielectric layer to withstand higher applied voltages without causing dielectric breakdown across the layer and subsequent failure of the electrostatic chuck.

Another important consideration in the manufacturing of electrostatic chucks is the porosity of the dielectric layer. A porous dielectric layer is less resistant to bombardment from plasma during processing and, therefore, may wear down relatively quickly, increasing the downtime and decreasing the throughput of the wafer manufacturing process. Porosity also has an adverse effect on the electrical characteristics of the dielectric layer, i.e., the layer's electrical stability and dielectric strength. In addition, a porous dielectric layer tends to absorb moisture and/or gases from the chamber into the open pores of the dielectric layer. Moisture and gas build-up within these pores further degrades the electrical characteristics of the dielectric layer.

Dielectric layers are typically formed by plasma spraying a ceramic powder, such as aluminum oxide, onto the upper surface of a metallic pedestal. In the plasma spray process, an electric arc is established between a pair of spaced electrodes, and gas is directed in contact with one of the electrodes so that the gas contains an electric arc. The powder used to produce the coating is mixed with the arc-containing gas and the mixture is constricted through a nozzle and deposited on the pedestal to form the dielectric layer. Although the plasma spraying process produces adequate dielectric layers, it would be desirable to improve the electrical properties of these dielectric layers to thereby improve the performance and increase the lifetime of electrostatic chucks.

In addition, it would be desirable to improve the yield produced during the manufacturing of electrostatic chucks (i.e., the ratio of the amount of serviceable electrostatic chucks to the total amount of chucks produced). One factor that reduces the yield of chucks produced by the plasma spray process is metallic contamination during processing. Metal particles are occasionally removed from the electrodes during plasma spraying and mixed into the powder that forms the dielectric layer. Metal particles on the surface of the dielectric layer may damage the semiconductor wafer during processing. In addition, the metal particles may provide a conductive path that allows voltage to arc through the dielectric layer. For these reasons, electrostatic chucks having a critical amount of metal contaminants in the dielectric layer are typically considered unserviceable, which reduces the overall yield and increases the cost of manufacturing the electrostatic chucks.

SUMMARY OF THE INVENTION

The present invention provides an electrostatic chuck having an electrically insulating layer, such as a dielectric layer, with improved electrical properties and increased resistance to plasma and chemical corrosion. The invention also provides a method for fabricating the electrically insulating layer and applying the layer to a pedestal to form a portion of an electrostatic chuck.

The electrostatic chuck of the present invention comprises an electrically conductive pedestal and an electrically insulating layer applied to the upper surface of the pedestal. The electrically insulating layer is usually a dielectric layer formed from a ceramic material, such as aluminum oxide. The electrically insulating layer has a porosity that is at least less than 4 percent of its total volume. Usually, the porosity of the insulating layer is less than 2 percent and preferably less than 1% of its total volume. This low porosity enhances the layer's resistance to plasma bombardment and chemical corrosion and improves the electrical properties of the layer, such as the dielectric strength and the dielectric constant of the layer. In addition, the low porosity decreases the adsorption of moisture and other gases into the dielectric layer, which further enhances the electrical properties of the chuck.

The dielectric layer of the present invention has improved electrical properties over many existing dielectric layers for electrostatic chucks. Usually, the dielectric layer will have a strength greater than 300 V/mil and preferably greater than 400 V/mil in a substantially dry state. This high dielectric strength minimizes arc breakdown across the dielectric layer and subsequent failure of the electrostatic chuck during processing, thereby allowing the operator to apply larger clamping forces to the wafer. The dielectric layer of the present invention also has a stable dielectric constant of about 8.5 to 11, after a relatively short drying time, which reduces the downtime of the electrostatic chuck. In addition, the upper surface of the dielectric layer has an average surface roughness, $R_a$, of about 1–2 $R_a$ after suitably grinding. The smooth upper surface decreases particle contamination on the back side of semiconductor wafers that are placed on or near the upper surface of the dielectric layer.

Another advantage of the present invention is that the dielectric layer has a substantially low percentage of contaminants. Usually, the dielectric layer will have less than 400 ppm contaminants and preferably less than 200 ppm contaminants. Contaminants, particularly metallic contaminants, degrade the performance of the electrostatic chuck, because they may provide a conductive path that allows voltage to arc through the dielectric layer. In addition, the metallic contaminants may be transferred to the back side of the semiconductor wafers during processing, which damages or destroys the wafers.

The dielectric layer of the present invention is fabricated and applied to an electrically conducting pedestal with a detonation gun process. This process includes combining a coating material, preferably in the form of a powder, with a fuel gas mixture in a conventional or specialized detonation gun. The fuel gas mixture, such as oxygen-acetylene, is ignited to produce a detonation wave which travels down the barrel of the gun, where it heats the coating material and propels the coating material out of the gun and onto the generally planar surface of the pedestal. According to the method of the present invention, the powder supplied to the detonation gun is a relatively pure form of aluminum oxide that contains a substantially low amount of contaminants (on the order of less than 400 ppm). Unlike the plasma spray process of the prior art, in the detonation gun process, metallic particles are typically not removed from the gun barrel and deposited onto the pedestal. In fact, it has been found that the percentage of contaminants in the resulting dielectric layer is substantially less than the percentage of contaminants in the aluminum oxide powder. This increases the yield and decreases the cost of manufacturing the electrostatic chucks.

DESCRIPTION OF THE SPECIFIC EMBODIMENTS

Figure 1:
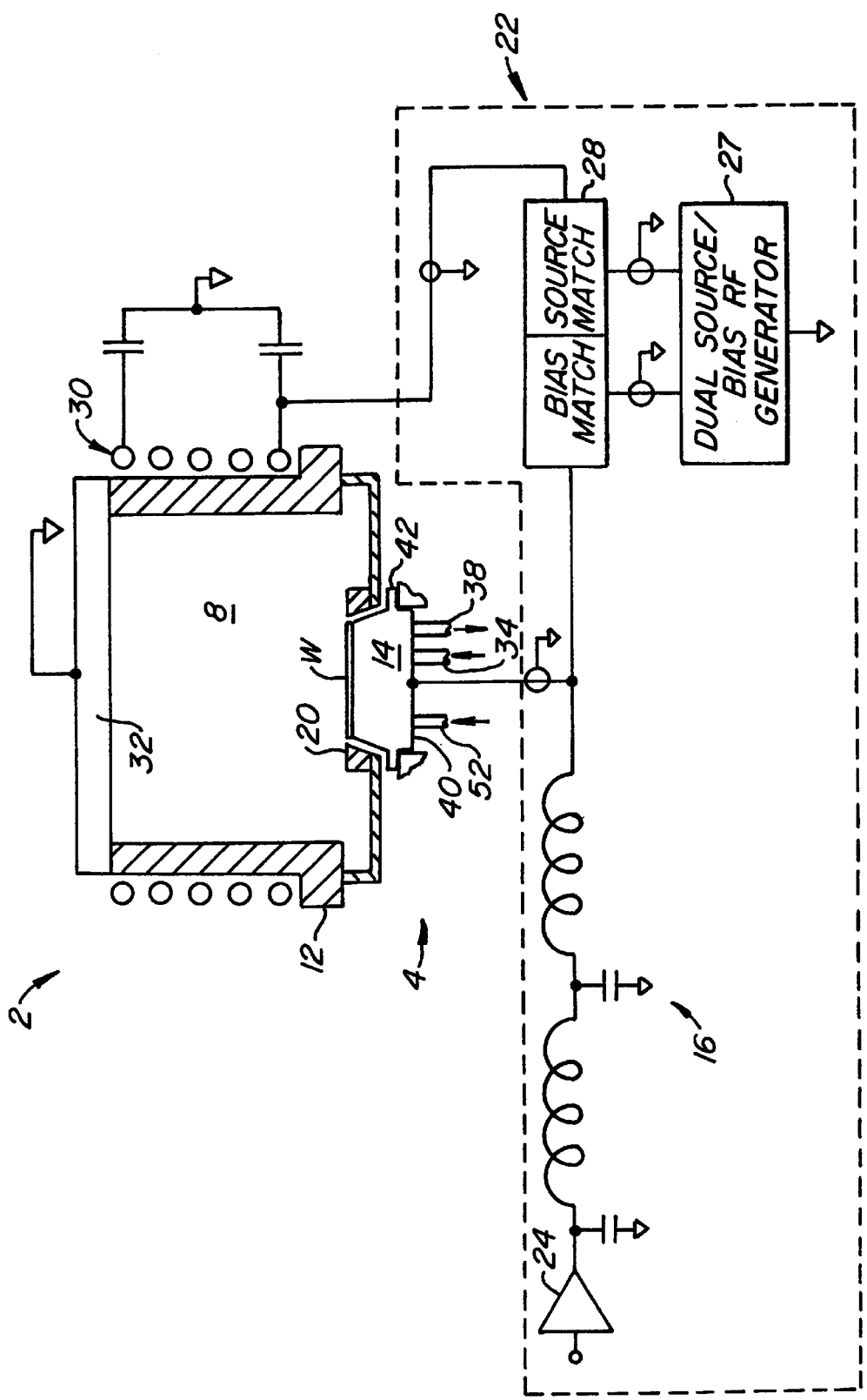
FIG. 1 is a schematic illustration of a high density plasma reaction chamber incorporating an electrostatic chuck according to the principles of the present invention.
Figure 3:
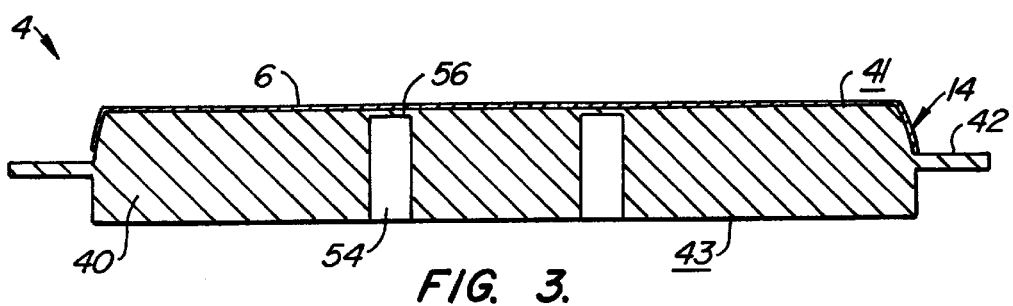
FIG. 3 is a sectional side view along the lines 3—3 in FIG. 2 illustrating the internal construction of the pedestal of FIG. 2.

FIG. 1 illustrates a representative wafer processing apparatus 2 incorporating an electrostatic chuck 4 that includes a pedestal assembly 14 and an electrical circuit 22. Electrostatic chuck 4 supports and electrostatically holds a semiconductor wafer W on pedestal assembly 14 within a high density plasma reaction chamber 8 of the apparatus 2. As shown in FIG. 3, pedestal assembly 14 generally comprises dielectric layer 6 applied to the upper surface of a metallic support body 40.

Wafer processing apparatus 2 is attached to a mainframe unit (not shown) which provides electrical, plumbing and other support functions for the chamber. Apparatus 2 will usually be removably attached to the mainframe unit, e.g., with bolts, so that the plasma reaction chamber 8 can be removed for maintenance or repair or can be replaced with another chamber. Mainframe units that are compatible with the illustrative embodiment of wafer processing apparatus 2 are currently commercially available as the Precision 5000™ and the Centura 5200™ systems from Applied Materials, Inc. of Santa Clara. It should be understood, however, that although the invention is shown and described as part of a plasma reaction chamber in a multi chamber processing system, it is not intended to be limited in this manner. That is, the invention can be used in a variety of processing chambers, such as deposition or etching chambers, batch chambers or the like.

Wafer processing apparatus 2 includes an enclosure assembly 12 housing the plasma reaction chamber 8 and pedestal assembly 14. Enclosure assembly 12 includes a cover ring 20 or hot process kit supported around pedestal assembly 14. Cover ring 20 comprises a dielectric material that serves to prevent or minimize plasma in chamber 8 above the wafer W from contacting, and thereby corroding, part of the electrostatic chuck 4. Accordingly, cover ring 20 is preferably positioned within about 0.005 to 0.02 inches of the edges of wafer W and chuck 4, a gap which is generally too small for the plasma to penetrate.

Electrical circuit 22 is a conventional circuit that includes a DC voltage source 24 and an RF power supply 27. DC voltage source 24 supplies a suitable clamping voltage, e.g., about 1000 volts, between the wafer and the pedestal assembly 14 and is coupled to pedestal assembly 14 through a low-pass filter 26 which isolates the DC voltage source 24 from the RF power supply 27. RF source power and RF bias power are each coupled from the RF power supply 27 through an impedance-matching network 28, with the source power being coupled to an inductive antenna 30 and the bias power being coupled to pedestal assembly 14. A ground reference for both the RF bias power and DC voltage is a grounded top electrode 32. The DC voltage source 24 supplies the clamping voltage for developing an electric field to electrostatically hold the wafer W to the pedestal. When it is desired to release (or "de-chuck") the wafer W, source 24 may be switched either to a zero output voltage or to a reverse polarity voltage if it is desired to accelerate the release of the wafer.

The plasma reaction chamber employs inductive-coupled RF power to generate and maintain a high-density plasma. RF bias power is capacitively coupled to the pedestal assembly 14, with the grounded counter electrode 32 providing a return path for bias current. A more detailed description of the illustrative plasma reaction chamber 8 and its operation in processing wafer W can be found in commonly assigned U.S. Pat. No. 5,350,479 to Collins et al., the complete disclosure of which is incorporated herein by reference.

Figure 2:
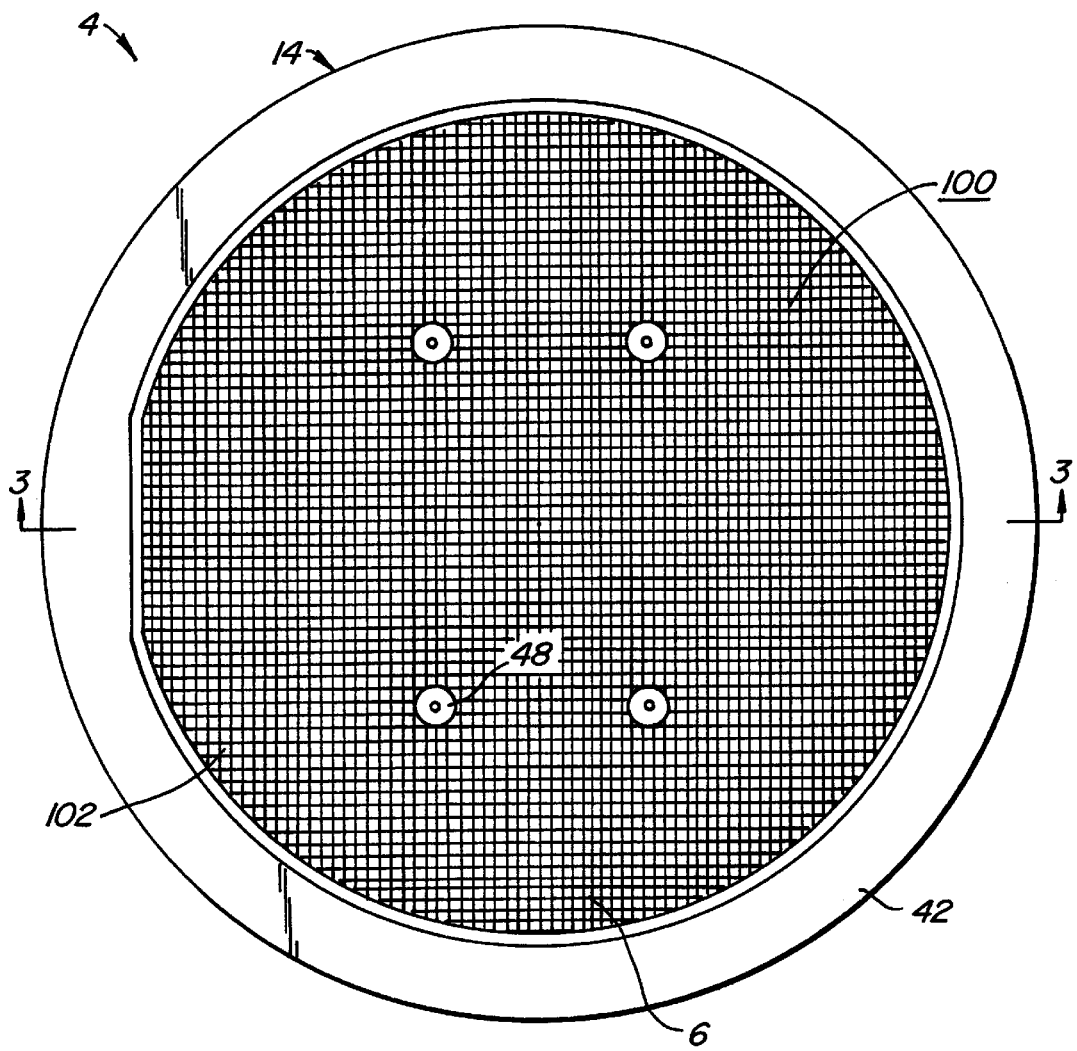
FIG. 2 is a top view of a pedestal and a dielectric layer included in the electrostatic chuck of FIG. 1.

Referring to FIGS. 2 and 3, pedestal assembly 14 comprises a support body 40 preferably fabricated as an integral block from an electrically conducting material having a relatively high thermal mass and good thermal conductivity to facilitate the absorption of heat from a wafer cooled over its upper surface. Aluminum, preferably 6061-T6 aluminum, is the preferred material for support body 40 because it has a relatively high thermal conductivity of approximately 2.37 watts/cm-°C. and it is generally process compatible with wafer W. Of course, support body 40 may comprise other metals, such as stainless steel or nickel. Support body 40 defines substantially flat upper and lower surfaces 41, 43, respectively, and an annular mounting flange 42 extending outwardly from the outer surface of body 40. A voltage is applied to pedestal assembly 14 by DC voltage source 24 (FIG. 1) to generate the electrostatic attraction force which holds the wafer W in close proximity to upper surface 41 of body 40.

As shown in FIG. 1, wafer support body 40 is preferably cooled with direct liquid cooling provided by cooling water entering an inlet port 34 at lower surface 43 of body 40 and travelling through cooling passages (not shown) to exit pedestal assembly 14 through an outlet port 38. The cooling passages are preferably machined into support body 40 to provide good thermal conductivity, and have a cross-sectional diameter of about ¼ inch. In operation, a cooling fluid is pumped through inlet port 34 at a maximum pressure of about 5.6 kg/cm² and circulated through the cooling passages to convectively remove heat from support body 40. The cooling fluid is preferably glycol/water from a heat exchanger (not shown) at approximately 15° C.–25° C.

Referring again to FIGS. 2 and 3, electrostatic chuck 4 comprises a smooth layer of dielectric material 6 bonded to upper surface 41 of support body 40 for supporting the lower surface of wafer W. The dielectric layer 6 uniformly covers the entire upper surface 41 of support body 40 except for the region overlying four lift pin holes 48. The dielectric layer 6 is preferably made from a ceramic powder that is thermally sprayed over upper surface 41 of support body 40 to form a thin ceramic layer thereon (usually on the order of 0.10 to 0.30 inches). The ceramic powder may comprise alumina, aluminum oxide, an alumina/titania composite, aluminum nitride or the like. Preferably, the powder substantially comprises aluminum oxide, usually at least 99% and preferably at least 99.5%. The aluminum oxide particles will typically have a small particle size, i.e., 99 percent of the particles in the aluminum oxide powder are less than 150 microns (maximum lateral dimension) and less than 5% of the particles are under 13 microns. This small particle size increases the uniformity of the heating during the detonation gun process discussed below.

The aluminum oxide powder has a low level of contamination, usually containing less than 800 ppm total contaminants in the powder and preferably containing less than 400 ppm total contaminants in the powder. The dielectric layer 6 will have even lower levels of contamination, usually containing less than 300 ppm and preferably containing less than 120 ppm total contaminants in the layer. As used herein, contaminants are defined as any foreign element that is not aluminum oxide. Table I illustrates the preferred contamination levels of the elements within the aluminum powder and the resulting dielectric layer 6. In particular, it should be noted that the aluminum powder contains low levels of metallic particles, such as tungsten and copper and iron. Contaminants, particularly metallic contaminants, degrade the performance of the electrostatic chuck, because they may provide a conductive path that allows the voltage to arc through the dielectric layer. In addition, the metallic contaminants may be transferred to the back side of the semiconductor wafers during processing, which damages or destroys the wafers.

TABLE I

| Contaminant | Al₂O₃ spray powder (ppm-max.) | finished coating (ppm-max.) |
| --- | --- | --- |
| Na | 150 | 20 |
| Mg | 20 | 10 |
| Ca | 150 | 50 |
| Fe | 10 | 10 |
| Cr | 10 | 10 |
| Cu | 50 | 10 |

Dielectric layer 6 of the present invention has a lower porosity than previous dielectric layers for electrostatic chucks. Usually, the apparent microstructural porosity of dielectric layer 6 is less than 4% of the total volume of dielectric layer 6. Preferably, the porosity is less than 2% and more preferably less than 1%. The coating density of the layer is typically about 3.3 to 3.8 grams/cubic centimeter. This low porosity and high density enhances the dielectric layer's resistance to plasma bombardment and chemical corrosion, which enhances the electrical properties of the layer. In addition, the lower porosity of the dielectric layer decreases adsorption of moisture and other gases into the dielectric layer during processing, further improving the electrical properties of the chuck.

Dielectric layer 6 has a dielectric strength of at least 300 Volts/mil in a substantially dry state and preferably at least 400 Volts/mil in a substantially dry state. This allows layer 6 to withstand relatively large applied voltages without causing dielectric breakdown across the dielectric layer and subsequent failure of the electrostatic chuck. In addition, the dielectric constant of layer 6 will preferably range between about 8.5 to 10.5 in the dry state. Typically, the chucking force of an electrostatic chuck, i.e., the force with which the wafer is held in place on the chuck, can be expressed as:

$$F \text{ to } kV^2/t^2$$

where F is the chucking force, k is the dielectric constant of layer 6, V is the applied voltage to the chuck and t is the thickness of the dielectric layer 6. Accordingly, decreasing the thickness of layer 6 increases the clamping force of the chuck without increasing the applied voltage.

Applicant has found that the dielectric layer of the present invention will require substantially less drying time than previous processes to remove sufficient moisture from the layer to obtain this dielectric constant. As discussed in more detail below, the moisture can typically be completely removed from layer 6 in about 2 hours (as compared to about 24 hours with previous processes). In addition, dielectric layer 6 has a high bond strength to enhance the bond between layer 6 and support body 40. Dielectric layer 6 usually has a bond strength greater than 5,000 psi, preferably greater than 8,000 psi and more preferably greater than 10,000 psi. The resistivity of dielectric layer 6 is also improved over previous designs. The DC impedance at 1000 Volts in air (as measured via a Biddle Insulation Tester) of dielectric layer 6 is usually greater than 200 Mega ohms for 10 mils in the dry state.

Figure 4:
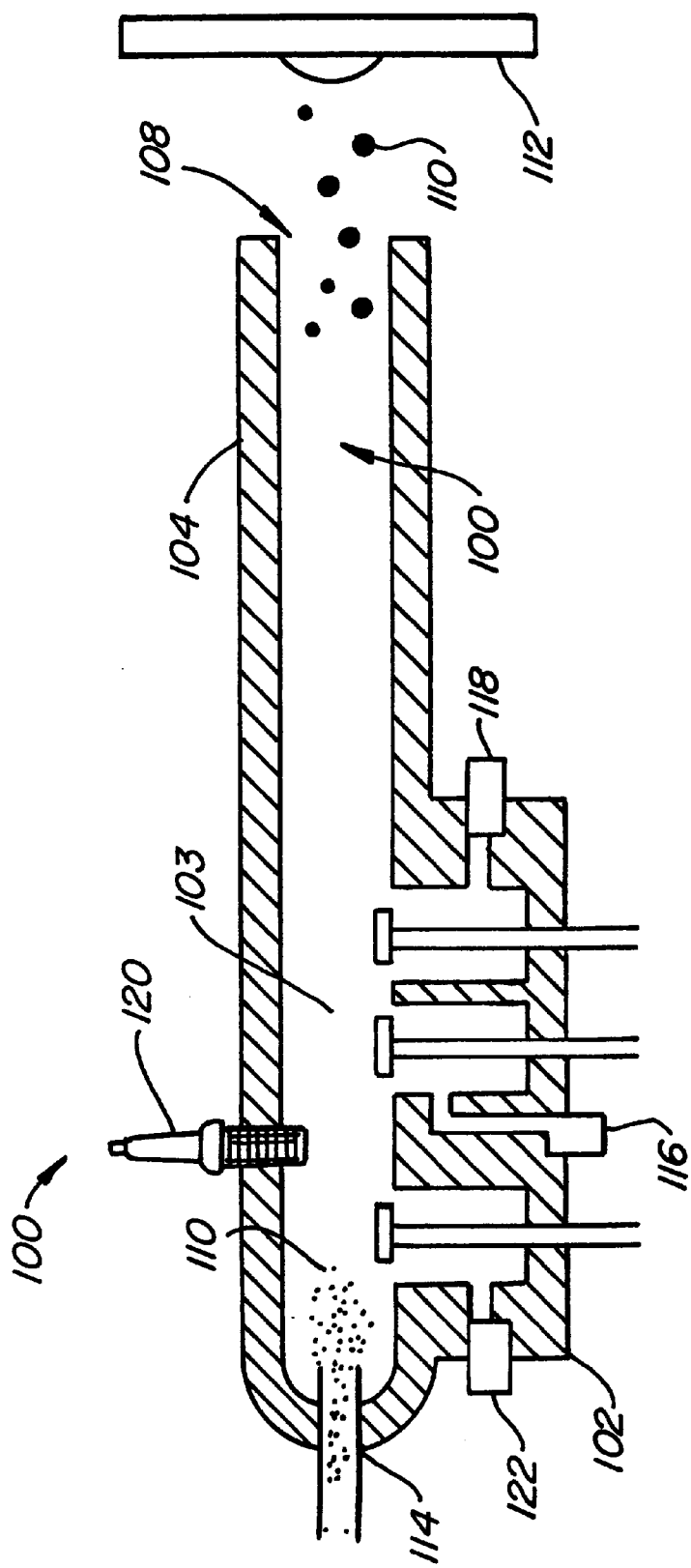
FIG. 4 is a schematic view of the process for fabricating the dielectric layer of FIG. 2.

Referring to FIG. 4, the method for fabricating dielectric layer 6 and for applying layer 6 to support body 40 of pedestal 14 will now be described. FIG. 4 schematically represents a representative detonation gun 100 having a main body 102 defining an inner combustion chamber 103 and a gun barrel 104 defining an inner passage 106 in communication with combustion chamber 103. Gun barrel 104 includes a nozzle 108 for discharging powder particles 110 onto a workpiece 112, such as metallic support body 40 of electrostatic chuck 4. Gun 100 further includes a powder inlet port 114 and two fuel gas inlet ports 116, 118 for injecting a fuel gas mixture of at least one combustible gas. A spark plug 120 extends into chamber 103 for igniting the fuel gas mixture.

Preferably, the invention will utilize at least two combustible gases selected from the group of saturated and unsaturated hydrocarbons. The group may include acetylene, propylene, methane, ethylene, methyl acetylene, propane, ethane, butadienes, butylenes, butanes, cyclopropane, propadiene, cyclobutane and ethylene oxide. The preferred fuel mixture comprises oxygen and acetylene. A variety of detonation guns having the structure described above or an equivalent structure can be adapted for use in the inventive process. For example, detonation guns that are suitable for the present invention are known under the trade names of D-gun™ and Super D-gun™ manufactured by Praxair S. T., Inc. of Indianapolis, Ind.

In use with the present invention, a mixture of oxygen and acetylene is fed through ports 116, 118 into combustion chamber 103 and a charge of aluminum oxide powder 110 is fed through port 114 via a carrier gas, such as nitrogen or air, into chamber 102. The fuel gas is ignited with spark plug 120 and the resulting detonation wave accelerates powder 110 through passage 106 of barrel 104 and heats powder 110 to a temperature above its melting point. The detonation wave typically attains a velocity of about 2800 to 3300 m/s and the particle velocity is typically about 700 to 1000 m/s. Nozzle 108 of gun barrel 104 is preferably positioned between about 50 to 200 mm from upper surface 41 of support body 40 so that the powder particles 110 spray out onto upper surface 41 to form dielectric layer 6.

According to the present invention, the detonation gun process will be carried out in pressure and temperature conditions that maintain substantially all of the aluminum oxide particles in the gamma phase. Preferably, at least 80% of the aluminum oxide particles will remain in the gamma phase and more preferably at least 99% of these particles will remain in the gamma phase. The gamma phase of aluminum oxide is a distorted or non-ordered crystalline phase of aluminum oxide. Allowing the aluminum oxide particles to transform back to the alpha phase causes a change in volume, which leads to cracks in the coating. Thus, maintaining the gamma phase throughout the detonation gun process minimizes cracking in the final dielectric layer. In addition, providing a dielectric layer with a substantially uniform single phase (i.e., 99% gamma phase) offers a number of advantages. For example, a single phase dielectric layer is easier to inspect because it has a generally uniform appearance. A single phase dielectric layer also distributes charge more uniformly, which facilitates uniform positioning of the wafer over the electrostatic chuck during processing.

The aluminum oxide particles are maintained in the gamma phase by controlling their temperature and by controlling the rate of cooling after the powder has been deposited onto the metal pedestal. Aluminum oxide particles will typically transition from the alpha phase to the gamma phase at a critical transition temperature, in all cases of a plasma spray process. Of course, this temperature may vary depending on other factors, such as the pressure and volume of the chamber and the like. Preferably, the aluminum oxide particles will not exceed 1000° C. during the entire detonation gun process.

The following example is provided below to illustrate the present invention.

EXAMPLE

A gaseous mixture of acetylene and oxygen was introduced into combustion chamber of detonation gun along with the coating powder shown in Table I. The aluminum oxide coating powder was fed into the detonation gun at approximately the same time as the gaseous mixture. The detonation gun was fired at a rate of about 8 times per second and the coating powder in the detonation gun was propelled onto an aluminum pedestal to form a dense, adherent coating of shaped microscopic leaves interlocking and overlapping each other.

The physical and electrical properties of the dielectric layer are summarized in Table II. As shown, the dielectric layer had a porosity of 1 to 2% and a density of about 3.5 grams/cu. The dielectric layer was ground with a 500 grit wheel to obtain a surface roughness of about 1 to 2 $R_a$. Applicant believes that the smooth surface of the dielectric layer is a result of the relatively high density and low porosity. This smooth surface decreases particle contamination on the back of wafers during processing. In addition, the relatively high density allows the dielectric layer to be more resistant to corrosive attack in the processing chamber.

TABLE II

| Coating | Porosity | Surface Roughness | Bond Strength (psi) | Dielectric Strength D.S. (V/mil) | Dielectric Constant (k) (100 KHz) |
|---|---|---|---|---|---|
| $Al_2O_3$ | 1 to 2% | 1 to 2 | >10,000 | >400 V/mil | 8.5–11 |

As shown in Table II, the dielectric layer had a bond strength of greater than 10,000 psi and a dielectric strength of greater than 400 V/mil. The dielectric strength of the layer was measured per ASTM Standard D150-92. The dielectric constant of the layer was 8.5 to 11 at about 100 kHz. The dielectric constant was measured after about 2 hours of drying to remove moisture from the dielectric layer. It was determined that the dielectric constant remained about the same after 24 hours of drying, indicating that moisture removal is substantially complete after two hours. These values were measured per ASTM Standard D 149-92.

While the above is a full description of the specific embodiments, various modifications, alternative constructions and equivalents may be used. For example, while the description above is in terms of a high-density plasma reaction chamber for a multi chamber processing system, it would be possible to implement the present invention with other plasma etching chambers, or the like. Therefore, the above description and illustrations should not be taken as limiting the scope of the present invention defined by the appended claims. In addition, it should be further noted that the invention is not limited to a single wafer chamber as described above and shown in the enclosed drawings. For example, the electrostatic chuck could be installed into batch chamber that simultaneously processes a plurality of wafer. In addition, the invention would be suitable for use in a multi wafer chamber that sequentially performs individual processing steps on each of the wafers.

What is claimed is:

1. An electrostatic chuck for a wafer processing apparatus comprising:
   a pedestal having a target surface, said pedestal comprising an electrically conductive material; and
   an electrically insulating layer positioned on the target surface, the electrically insulating layer having a porosity less than 2 percent of the volume of the electrically insulating layer and a density of 3.3 to 3.8 grams per cubic centimeter.

2. The chuck of claim 1 wherein the insulating layer comprises a dielectric material.

3. The chuck of claim 2 wherein the dielectric layer comprises aluminum oxide.

4. The chuck of claim 3 wherein the aluminum oxide is substantially in the gamma phase.

5. The chuck of claim 3 wherein the aluminum oxide is 99% gamma phase.

6. The chuck of claim 1 wherein the electrically insulating layer has a porosity of less than 1 percent of the volume of the electrically insulating layer.

7. The chuck of claim 1 wherein the electrically insulating layer has a coating density of about 3.5 grams per cubic centimeter.

8. The chuck of claim 1 wherein the electrically insulating layer has a dielectric constant of about 8.5 to 11 in a substantially dry state.

9. The chuck of claim 1 wherein the electrically insulating layer has a dielectric strength of at least 400 Volts per mil in a substantially dry state.

10. The chuck of claim 1 wherein the electrically insulating layer has a dielectric strength of at least 500 Volts per mil in a substantially dry state.

11. The chuck of claim 1 wherein the electrically insulating layer has a resistivity of at least 200 M ohms for 10 mils in a substantially dry condition.

12. The chuck of claim 1 wherein the electrically insulating layer has a surface roughness of less than 5 Ra.

13. The chuck of claim 1 further comprising means for applying a voltage between the wafer and the pedestal to generate a columbic force for holding the wafer onto the electrically insulating layer.

14. The chuck of claim 1 wherein the electrically insulating layer has a bond strength of at least 8,000 psi.

15. The chuck of claim 1 wherein the electrically insulating layer has a bond strength of at least 10,000 psi.

16. The chuck of claim 1 wherein the electrically insulating layer comprises a maximum of 10 ppm of magnesium, 10 ppm of iron and 10 ppm of copper.

17. The chuck of claim 1 wherein said electrically insulating layer is a detonation-sprayed layer.

18. The electrostatic chuck of claim 1 wherein said electrically insulating layer comprises aluminum oxide particles wherein at least 80% of said aluminum oxide particles are in the gamma phase.

19. The electrostatic chuck of claim 1 wherein said electrically insulating layer comprises aluminum oxide particles wherein at least 99% of said aluminum oxide particles are in the gamma phase.

20. An electrostatic chuck for a wafer processing apparatus comprising:
an electrically conductive element having a target surface; and
an electrically insulative layer positioned proximate to the target surface;
wherein the electrically insulating layer has a porosity of less than 4 percent of the volume of the electrically insulating layer and a density of 3.3 to 3.8 grams per cubic centimeter.

21. The chuck of claim 20 wherein the electrically insulating layer has a dielectric strength of at least 400 Volts per mil in a substantially dry condition.

22. The chuck of claim 20 wherein said electrically insulative layer is a detonation-sprayed layer.

23. The electrostatic chuck of claim 20 wherein said electrically insulative layer comprises aluminum oxide particles wherein at least 80% of said aluminum oxide particles are in the gamma phase.

24. The electrostatic chuck of claim 20 wherein said electrically insulative layer comprises aluminum oxide particles wherein at least 99% of said aluminum oxide particles are in the gamma phase.

25. An apparatus for fabricating an integrated circuit device comprising:
an enclosure assembly housing a processing chamber; and
an electrostatic chuck disposed within the processing chamber, the electrostatic chuck comprising:
a metallic support body having an upper surface;
a dielectric layer formed on at least a portion of the upper surface of the support body, the dielectric layer having a porosity of less than 2 percent of the volume of the dielectric layer and a density of 3.3 to 3.8 grams per cubic centimeter; and
a voltage source coupled to the electrode for applying a voltage between the wafer and the electrode to generate a columbic force for holding the wafer onto the dielectric layer.

26. The apparatus of claim 25 wherein the dielectric layer comprises an aluminum oxide coating having a bond strength greater than 10,000 psi.

27. The apparatus of claim 25 wherein the dielectric layer comprises an aluminum oxide coating having a dielectric strength greater than 400 Volts per mil in a substantially dry condition.

28. The apparatus of claim 25 wherein said dielectric layer is a detonation-sprayed layer.

29. The apparatus of claim 25 wherein said dielectric layer comprises aluminum oxide particles wherein at least 80% of said aluminum oxide particles are in the gamma phase.

30. The apparatus of claim 25 wherein said dielectric layer comprises aluminum oxide particles wherein at least 99% of said aluminum oxide particles are in the gamma phase.

31. An electrostatic chuck for holding a wafer during processing in a wafer processing apparatus, the electrostatic chuck formed by a process comprising:
providing a pedestal having an electrically conductive surface;
combining a powder and a fuel gas mixture with said powder including particles of a predetermined size;
igniting the fuel gas mixture; and
forming an electrically insulating layer having a porosity of less than 4% and a density of 3.3 to 3.8 grams per cubic centimeter by detonation spraying the powder onto the electrically conducting surface of the pedestal.

32. The electrostatic chuck of claim 31 wherein said detonation spraying comprises producing a detonation wave and accelerating the powder to a speed of at least 700 m/s.

33. The electrostatic chuck of claim 32 further comprising heating the powder to a temperature near the melting point of the powder during the acceleration step.

34. The electrostatic chuck of claim 31 wherein the predetermined size is less 150 microns.

35. The electrostatic chuck of claim 34 wherein a sub-portion of said particles includes particles having a size less that 13 microns.

36. The electrostatic chuck of claim 35 wherein the sub-portion includes less than 5% of the particles in the powder.

37. The electrostatic chuck of claim 35 further comprising maintaining the aluminum oxide substantially in the gamma phase.

38. The electrostatic chuck of claim 37 wherein the maintaining step is carried out using aluminum oxide comprising at least 80% gamma phase.

39. The electrostatic chuck of claim 37 wherein the maintaining step is carried out using aluminum oxide comprising at least 99% gamma phase.

40. The electrostatic chuck of claim 31 wherein the powder comprises a maximum of 10 ppm of iron, 20 ppm of magnesium and 10 ppm of copper.

41. A method for fabricating an electrostatic chuck comprising:
providing an electrically conductive pedestal having a substantially planar surface;

combining a ceramic powder and a fuel gas mixture in a chamber a sub-portion of said particles includes particles having a size less that 13 microns, with said subportion comprising less than 5% of the powder;

igniting the fuel gas mixture to form a detonation wave; and detonation spraying the powder onto the planar surface of the pedestal to form an electrically insulating layer bonded to the planar surface, said layer having a porosity of less than 4% and a density of 3.3 to 3.8 grams per cubic centimeter.

42. The process of claim 41 wherein the electrically insulating layer comprises aluminum oxide.

43. The process of claim 41 wherein said detonation spraying comprises accelerating the powder to a speed of at least 700 m/s.

44. The process of claim 43, wherein the accelerating further comprises heating the powder to a temperature near the melting point of the powder.

45. The process of claim 41 wherein the powder comprises at least 95% by weight aluminum oxide.

* * * * *